United States Patent
Chen

(10) Patent No.: US 10,616,796 B2
(45) Date of Patent: Apr. 7, 2020

(54) METHOD AND DEVICE FOR DATA TRANSMISSION

(71) Applicant: CHINA ACADEMY OF TELECOMMUNICATIONS TECHNOLOGY, Beijing (CN)

(72) Inventor: Li Chen, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 84 days.

(21) Appl. No.: 15/542,046

(22) PCT Filed: Dec. 22, 2015

(86) PCT No.: PCT/CN2015/098262
§ 371 (c)(1),
(2) Date: Jul. 6, 2017

(87) PCT Pub. No.: WO2016/141750
PCT Pub. Date: Sep. 15, 2016

(65) Prior Publication Data
US 2018/0035328 A1    Feb. 1, 2018

(30) Foreign Application Priority Data

Mar. 6, 2015   (CN) .......................... 2015 1 0100678

(51) Int. Cl.
*H04W 28/06*   (2009.01)
*H04L 29/06*   (2006.01)
(Continued)

(52) U.S. Cl.
CPC ............ *H04W 28/06* (2013.01); *H04L 29/06* (2013.01); *H04L 63/164* (2013.01); *H04L 69/22* (2013.01);
(Continued)

(58) Field of Classification Search
CPC .... H04W 28/06; H04W 12/08; H04L 63/164; H04L 69/22
(Continued)

(56) References Cited

U.S. PATENT DOCUMENTS 6,697,604 B1 * 2/2004 Rimpela ............... H04W 24/00
455/423
8,837,440 B2 * 9/2014 Feng ................. H04W 72/0413
370/336
(Continued)

FOREIGN PATENT DOCUMENTS

CN         1402494 A    3/2003
CN         1859397 A    11/2006
(Continued)

OTHER PUBLICATIONS

NPL Search Results (Year: 2019).*
(Continued)

*Primary Examiner* — Syed A Zaidi
(74) *Attorney, Agent, or Firm* — Ladas & Parry, LLP

(57) ABSTRACT

The present disclosure provides a method and a device for data transmission. The method for data transmission includes steps of: determining, by a transmitting end, a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and transmitting, by the transmitting end, data in accordance with the determined protocol layer structure and/or protocol layer function.

16 Claims, 6 Drawing Sheets

```
┌─ 1300
determining, by a transmitting end, a protocol layer structure and/or a protocol
layer function to be used for uplink/downlink data transmission in accordance
with a configuration at a network side, the protocol layer structure and/or
protocol layer function configured at the network side being determined in
accordance with a transmission requirement of a terminal ↓
┌─ 1301
transmitting, by the transmitting end, data in accordance with the determined
protocol layer structure and/or protocol layer function
```

(51) Int. Cl.
*H04W 4/70* (2018.01)
*H04W 12/08* (2009.01)

(52) U.S. Cl.
CPC ............. *H04W 4/70* (2018.02); *H04W 12/08* (2013.01); *Y02D 70/00* (2018.01); *Y02D 70/1262* (2018.01); *Y02D 70/21* (2018.01)

(58) Field of Classification Search
USPC ........................................................ 713/151
See application file for complete search history.

(56) References Cited

U.S. PATENT DOCUMENTS

| | | | | |
|---|---|---|---|---|
| 2005/0243762 | A1* | 11/2005 | Terry | H04W 28/18 370/328 |
| 2007/0147326 | A1* | 6/2007 | Chen | H04W 74/002 370/338 |
| 2008/0026726 | A1* | 1/2008 | Tariq | H04L 63/102 455/411 |
| 2009/0238129 | A1* | 9/2009 | Park | H04W 76/22 370/329 |
| 2009/0304184 | A1* | 12/2009 | Miyagawa | H04L 9/12 380/274 |
| 2010/0027460 | A1* | 2/2010 | Kim | H04L 1/1819 370/315 |
| 2010/0124191 | A1 | 5/2010 | Vos et al. | |
| 2010/0135215 | A1* | 6/2010 | Tang | H04L 5/0044 370/328 |
| 2012/0320884 | A1* | 12/2012 | Jamadagni | H04W 28/10 370/336 |
| 2014/0177534 | A1* | 6/2014 | McHardy | H04W 72/04 370/329 |
| 2014/0280857 | A1* | 9/2014 | Yang | H04L 67/30 709/223 |
| 2015/0078351 | A1* | 3/2015 | An | H04W 74/08 370/336 |
| 2017/0188400 | A1* | 6/2017 | Tian | H04W 74/00 |

FOREIGN PATENT DOCUMENTS

| | | |
|---|---|---|
| CN | 101931931 A | 12/2010 |
| CN | 101969635 A | 2/2011 |
| CN | 102158901 A | 8/2011 |
| CN | 103781192 A | 5/2014 |
| WO | 2013/049768 A1 | 4/2013 |
| WO | 2013/177337 A1 | 11/2013 |
| WO | 2013016862 A1 | 2/2017 |

OTHER PUBLICATIONS

International Search Report for PCT/CN2015/098262 dated Mar. 24, 2016 and its English translation provided by WIPO.
Written Opinion of the International Search Authority for PCT/CN2015/098262 dated Mar. 24, 2016 and its English translation provided by WIPO.
First Search for related Chinese Application 201110039049.4 provided by SIPO.
First Office Action and translation for related Chinese Application 201110039049.4 provided by SIPO.
Second Office Action and translation for related Chinese Application 201110039049.4 provided by SIPO.
International Preliminary Report on Patentability (IPRP; Ch. 1) for PCT/CN2015/098262 dated Sep. 21, 2017 and its English translation provided by WIPO.
From EPO 15884428.2, Extended European Search Report and Search Opinion dated Jan. 29, 2018.
From TW 104143769, Office Action dated May 24, 2017 with machine English translation from associate.

* cited by examiner

METHOD AND DEVICE FOR DATA TRANSMISSION

CROSS-REFERENCE TO RELATED APPLICATIONS

The present application is the U.S. national phase of PCT Application PCT/CN2015/098262 filed on Dec. 22, 2015, which claims a priority to Chinese patent application No. 201510100678.1 filed on Mar. 6, 2015, the disclosures of which are incorporated herein by reference in their entireties.

TECHNICAL FIELD

The present disclosure relates to the field of wireless communication technology, in particular to a method and a device for data transmission.

BACKGROUND

A fixed protocol stack structure is adopted by a relevant wireless transmission technique, and data needs to be added with a corresponding data head for each protocol layer, so as to be identified by different protocol layers. Taking a Long Term Evolution (LTE) system as an example, an air interface user plane 2 includes a Packet Data Convergence Protocol (PDCP) layer, a Radio Link Control (RLC) layer and a Medium Access Control (MAC) layer. A data packet processed by the user plane 2 is transmitted to a physical layer 1, and then processed such as being encoded and modulated at the physical layer 1 into a bit stream to be transmitted through the air interface. The PDCP layer has a header compression function and an encryption function, and after the header compression and encryption, an Internet Protocol (IP) data packet is taken as a PDCP Service Data unit (SDU), which is added with a PDCP header so as to form a PDCP Protocol Data Unit (PDU) transmitted to the RLC layer. The RLC layer has a segmentation function and a concatenating function. At the RLC layer, the PDCP PDU becomes an RLC SDU. The RLC layer may group a plurality of RLC SDUs into one RLC PDU, or segment one RLC SDU into a plurality of RLC PDUs. The MAC layer has a multiplexing function, and it may concatenate the RLC PDUs (also called as MAC SDUs for the MAC layer) from a plurality of bearers into one MAC PDU. The MAC PDU is then transmitted to the physical layer where a Cyclic Redundancy Check (CRC) addition and any other physical layer modulation and encoding treatment are performed, so as to generate a transmission block to be transmitted through the air interface. Upon the receipt of the bit stream from the physical layer, a receiver may parse the IP data packet in a process reverse to that mentioned above.

Due to a hierarchical modular design, architecture of an LTE protocol stack is generic to various service data, but it is not sufficiently advantageous to specific data transmission, e.g., signaling transmission and small-volume data transmission. Taking an Internet of Vehicles as an example, small data packets are mainly transmitted, and each vehicle may transmit a large number of small data packets each in 1 to 100 bytes. In the case that the LTE protocol stack is adopted, as compared with valid information, excessive overhead may occur for the header submitted by each protocol layer.

All in all, it is impossible for a specific terminal with the fixed, modular protocol stack to achieve an optimal effect at a specific application scenario, in terms of transmission efficiency, time delay, processing complexity, cost overhead, power consumption, and etc. In addition, in the case that special requirements need to be met, e.g., at a scenario where the time delay is highly restricted, it is impossible for a commonly-designed fixed modular multi-layer protocol stack to meet the time delay requirement.

SUMMARY

An object of the present disclosure is to provide a method and a device for data transmission, so as to solve the problems in the related art where it is impossible for the specific terminal with the fixed, modular protocol stack to achieve an optimal effect at the specific application scenario, in terms of various aspects such as transmission efficiency, time delay, processing complexity, cost overhead, and power consumption, and in the case that special requirements need to be met, e.g., at a scenario where the time delay is highly required, it is difficult for the commonly-designed multi-layer protocol stack to meet the time delay requirement.

In one aspect, the present disclosure provides in some embodiments a method for data transmission, including steps of: determining, by a transmitting end, a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and transmitting, by the transmitting end, data in accordance with the determined protocol layer structure and/or protocol layer function.

In a first possible implementation associating with the first aspect, the step of determining, by the transmitting end, the protocol layer structure to be used for the uplink/downlink data transmission in accordance with the configuration at the network side includes: determining, by the transmitting end, the protocol layer structure to be used for the uplink/downlink data transmission in accordance with the configuration at the network side as at least one of the followings protocol layers: a PDCP layer, an RLC layer and an MAC layer, and the step of transmitting, by the transmitting end, the data in accordance with the determined protocol layer structure includes: organizing, by the transmitting end, the data in accordance with the determined protocol layer structure and transmitting the organized data.

In a second possible implementation associating with the first possible implementation of the first aspect, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the transmitting end, the data in accordance with the determined protocol layer structure includes adding, by the transmitting end, an MAC header to a high-layer data packet through the MAC layer.

In a third possible implementation associating with the first possible implementation of the first aspect, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the transmitting end, the data in accordance with the determined protocol layer structure includes: performing, by the transmitting end, header compression and encryption operations on a high-layer data packet through the PDCP layer, adding a PDCP header to obtain a PDCP PDU, performing treatment on the PDCP PDU through the MAC layer, and adding an MAC header to the treated PDCP PDU.

In a fourth possible implementation associating with the first possible implementation of the first aspect, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The step of organizing, by the transmitting end, the data in accordance with the determined protocol layer structure includes performing, by the transmitting end, header compression and encryption operations on a high-layer data packet through the PDCP layer, adding a PDCP header to obtain a PDCP PDU, performing treatment on the PDCP PDU through the RLC layer, and adding an RLC header to the treated PDCP PDU.

In a fifth possible implementation associating with the first possible implementation of the first aspect, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The step of organizing, by the transmitting end, the data in accordance with the determined protocol layer structure includes performing, by the transmitting end, treatment on a high-layer data packet through the RLC layer in accordance with a data volume capable of being supported by a transmission resource, adding an RLC header to obtain an RLC PDU, performing treatment on the RLC PDU through the MAC layer, and adding an MAC header to the treated RLC PDU.

In a sixth possible implementation associating with the first aspect, the step of determining, by the transmitting end, the protocol layer function to be used for the uplink/downlink data transmission in accordance with the configuration at the network side includes: determining, by the transmitting end, the protocol layer function to be used for the uplink/downlink data transmission in accordance with the configuration at the network side as at least one of the followings: a data packet concatenating function, a header compression function, a header encryption function and a multiplexing function. The step of transmitting, by the transmitting end, the data in accordance with the determined protocol layer function includes organizing, by the transmitting end, the data in accordance with the determined protocol layer function, and transmitting the organized data.

In a seventh possible implementation associating with the sixth possible implementation of the first aspect, the step of transmitting, by the transmitting end, the data in accordance with the determined protocol layer function includes: in the case that the protocol layer function to be used for the uplink/downlink data transmission includes the data packet concatenating function, performing, by the transmitting end, a concatenating operation on high-layer data packets, and organizing the concatenated high-layer data packets into a specific protocol layer and adding a specific protocol layer packet header; or in the case that the protocol layer function to be used for the uplink/downlink data transmission includes the header compression function, the encryption function and the data packet concatenating function, performing, by the transmitting end, encryption and header compression on high-layer data packets, performing a concatenating operation on the resultant high-layer data packets, organizing the concatenated high-layer data packets into a specific protocol layer and adding a specific protocol layer packet header; or in the case that the protocol layer function to be used for the uplink/downlink data transmission includes the data packet concatenating function and the bearer multiplexing function, performing, by the transmitting end, concatenating and bearer multiplexing operations on the high-layer data packets, performing a concatenating operation on the resultant high-layer data packets, organizing the concatenated high-layer data packets into a specific protocol layer and adding a specific protocol layer packet header. The specific protocol layer is a protocol layer capable of supporting the data packet concatenating function, and the specific protocol layer packet header includes a domain for indicating information about a parameter of the high-layer data packet.

In another aspect, the present disclosure provides in some embodiments a method for data transmission, including steps of: determining, by a receiving end, a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and receiving, by the receiving end, data in accordance with the determined protocol layer structure and/or protocol layer function.

In a first possible implementation associating with the second aspect, the step of determining, by the receiving end, the protocol layer structure to be used for the uplink/downlink data transmission in accordance with the configuration at the network side includes: determining, by the receiving end, the protocol layer structure to be used for the uplink/downlink data transmission in accordance with the configuration at the network side as at least one of the followings protocol layers: a PDCP layer, an RLC layer and an MAC layer, and the step of receiving, by the receiving end, the data in accordance with the determined protocol layer structure includes organizing, by the receiving end, the data in accordance with the determined protocol layer structure, and performing restoration on the received data.

In a second possible implementation associating with the first possible implementation of the second aspect, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the receiving end, the data in accordance with the determined protocol layer structure and performing restoration on the received data includes: restoring, by the receiving end, a high-layer data packet through the MAC layer in accordance with an MAC header indicator in the received data.

In a third possible implementation associating with the first possible implementation of the second aspect, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the receiving end, the data in accordance with the determined protocol layer structure and performing restoration on the received data includes: restoring, by the receiving end, a PDCP PDU through the MAC layer in accordance with an MAC header indicator in the received data, removing a PDCP header from the PDCP PDU through the PDCP layer, performing decryption and header decompression, and restoring the high-layer data packet.

In a fourth possible implementation associating with the first possible implementation of the second aspect, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The step of organizing, by the receiving end, the data in accordance with the determined protocol layer structure and performing restoration on the received data includes: restoring, by the receiving end, a PDCP PDU through the RLC layer in accordance with an RLC header indicator in the received data, removing a PDCP header from the PDCP PDU through the PDCP layer, performing decryption and header decompression, and restoring the high-layer data packet.

In a fifth possible implementation associating with the first possible implementation of the second aspect, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The step of organizing, by the receiving end, the data in accordance with the determined protocol layer structure and performing restoration on the received data includes: restoring, by the receiving end, an RLC PDU through the MAC layer in accordance with an MAC header indicator in the received data, removing an RLC header from the RLC PDU through the RLC layer, and restoring the high-layer data packet from concatenated data segments in accordance with an RLC header indicator.

In a sixth possible implementation associating with the second aspect, the step of determining, by the receiving end, the protocol layer function to be used for the uplink/downlink data transmission in accordance with the configuration at the network side includes: determining, by the receiving end, the protocol layer function to be used for the uplink/downlink data transmission in accordance with the configuration at the network side as at least one of the followings: a data packet concatenating function, a header compression function, a header encryption function and a multiplexing function. The step of receiving, by the receiving end, the data in accordance with the determined protocol layer function includes: organizing, by the receiving end, the data in accordance with the determined protocol layer function and performing restoration on the received data.

In a seventh possible implementation associating with the sixth possible implementation of the second aspect, the step of organizing, by the receiving end, the data in accordance with the determined protocol layer function and performing restoration on the received data includes: in the case that the protocol layer function to be used for the uplink/downlink data transmission includes the data packet concatenating function, restoring, by the receiving end, high-layer data packets in accordance with a specific protocol layer packet header indicator in the received data; or in the case that the protocol layer function to be used for the uplink/downlink data transmission includes the header compression function, the encryption function and the data packet concatenating function, restoring, by the receiving end, the data on which encryption and header compression operations have been performed in accordance with a specific protocol layer packet header indicator in the received data, performing decryption and header decompression operations on the data, and restoring the high-layer data packets; or in the case that the protocol layer function to be used for the uplink/downlink data transmission includes the data packet concatenating function and the bearer multiplexing function, restoring, by the receiving end, the high-layer data packets in accordance with a specific protocol layer packet header indicator in the received data. The specific protocol layer is a protocol layer capable of supporting the data packet concatenating function, and the specific protocol layer packet header includes a domain for indicating information about a parameter of the high-layer data packet.

In a third aspect, the present disclosure provides in some embodiments a transmission device for data transmission, including: a first determination module configured to determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and a transmission module configured to transmit data in accordance with the determined protocol layer structure and/or protocol layer function.

In a first possible implementation associating with the third aspect, the first determination module is further configured to determine the protocol layer structure to be used for the uplink/downlink data transmission in accordance with the configuration at the network side as at least one of the followings protocol layers: a PDCP layer, an RLC layer and an MAC layer, and the transmission module is further configured to organize the data in accordance with the determined protocol layer structure and transmit the organized data.

In a second possible implementation associating with the first possible implementation of the third aspect, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The transmission module is further configured to add an MAC header to a high-layer data packet through the MAC layer.

In a third possible implementation associating with the first possible implementation of the third aspect, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The transmission module is further configured to perform header compression and encryption operations on a high-layer data packet through the PDCP layer, add a PDCP header to obtain a PDCP PDU, perform treatment on the PDCP PDU through the MAC layer, and add an MAC header to the treated PDCP PDU.

In a fourth possible implementation associating with the first possible implementation of the third aspect, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The transmission module is further configured to perform header compression and encryption operations on a high-layer data packet through the PDCP layer, add a PDCP header to obtain a PDCP PDU, perform treatment on the PDCP PDU through the RLC layer, and add an RLC header to the treated PDCP PDU.

In a fifth possible implementation associating with the first possible implementation of the third aspect, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The transmission module is further configured to perform treatment on a high-layer data packet through the RLC layer in accordance with a data volume capable of being supported by a transmission resource, add an RLC header to obtain an RLC PDU, perform treatment on the RLC PDU through the MAC layer, and add an MAC header to the treated RLC PDU.

In a sixth possible implementation associating with the third aspect, the first determination module is further configured to determine the protocol layer function to be used for the uplink/downlink data transmission in accordance with the configuration at the network side as at least one of the followings: a data packet concatenating function, a header compression function, a header encryption function and a multiplexing function. The transmission module is further configured to organize the data in accordance with the determined protocol layer function, and transmit the organized data.

In a seventh possible implementation associating with the sixth possible implementation of the third aspect, the transmission module is further configured to: in the case that the protocol layer function to be used for the uplink/downlink data transmission includes the data packet concatenating function, perform a concatenating operation on high-layer data packets, and organize the concatenated high-layer data packets into a specific protocol layer and add a specific protocol layer packet header; or in the case that the protocol layer function to be used for the uplink/downlink data transmission includes the header compression function, the encryption function and the data packet concatenating function, perform encryption and header compression on high-layer data packets, perform a concatenating operation on the resultant high-layer data packets, organize the concatenated high-layer data packets into a specific protocol layer and add a specific protocol layer packet header; or in the case that the protocol layer function to be used for the uplink/downlink data transmission includes the data packet concatenating function and the bearer multiplexing function, perform concatenating and bearer multiplexing operations on the high-layer data packets, perform a concatenating operation on the resultant high-layer data packets, organize the concatenated high-layer data packets into a specific protocol layer and add a specific protocol layer packet header. The specific protocol layer is a protocol layer capable of supporting the data packet concatenating function, and the specific protocol layer packet header includes a domain for indicating information about a parameter of the high-layer data packet.

In a fourth aspect, the present disclosure provides in some embodiments a reception device for data transmission, including: a second determination module configured to determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and a reception module configured to receive data in accordance with the determined protocol layer structure and/or protocol layer function.

In a first possible implementation associating with the fourth aspect, the second determination module is further configured to determine the protocol layer structure to be used for the uplink/downlink data transmission in accordance with the configuration at the network side as at least one of the followings protocol layers: a PDCP layer, an RLC layer and an MAC layer, and the reception module is further configured to organize the data in accordance with the determined protocol layer structure, and perform restoration on the received data.

In a second possible implementation associating with the first possible implementation of the fourth aspect, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The reception module is further configured to restore a high-layer data packet through the MAC layer in accordance with an MAC header indicator in the received data.

In a third possible implementation associating with the first possible implementation of the fourth aspect, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The reception module is further configured to restore a PDCP PDU through the MAC layer in accordance with an MAC header indicator in the received data, remove a PDCP header from the PDCP PDU through the PDCP layer, perform decryption and header decompression, and restore the high-layer data packet.

In a fourth possible implementation associating with the first possible implementation of the fourth aspect, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The reception module is further configured to restore a PDCP PDU through the RLC layer in accordance with an RLC header indicator in the received data, remove a PDCP header from the PDCP PDU through the PDCP layer, perform decryption and header decompression, and restore the high-layer data packet.

In a fifth possible implementation associating with the first possible implementation of the fourth aspect, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The reception module is further configured to restore an RLC PDU through the MAC layer in accordance with an MAC header indicator in the received data, remove an RLC header from the RLC PDU through the RLC layer, and restore the high-layer data packet from concatenated data segments in accordance with an RLC header indicator.

In a sixth possible implementation associating with the fourth aspect, the second determination module is further configured to determine the protocol layer function to be used for the uplink/downlink data transmission in accordance with the configuration at the network side as at least one of the followings: a data packet concatenating function, a header compression function, a header encryption function and a multiplexing function. The reception module is further configured to organize the data in accordance with the determined protocol layer function and perform restoration on the received data.

In a seventh possible implementation associating with the sixth possible implementation of the fourth aspect, the reception module is further configured to: in the case that the protocol layer function to be used for the uplink/downlink data transmission includes the data packet concatenating function, restore high-layer data packets in accordance with a specific protocol layer packet header indicator in the received data; or in the case that the protocol layer function to be used for the uplink/downlink data transmission includes the header compression function, the encryption function and the data packet concatenating function, restore the data on which encryption and header compression operations have been performed in accordance with a specific protocol layer packet header indicator in the received data, perform decryption and header decompression operations on the data, and restore the high-layer data packets; or in the case that the protocol layer function to be used for the uplink/downlink data transmission includes the data packet concatenating function and bearer the multiplexing function, restore the high-layer data packets in accordance with a specific protocol layer packet header indicator in the received data. The specific protocol layer is a protocol layer capable of supporting the data packet concatenating function, and the specific protocol layer packet header includes a domain for indicating information about a parameter of the high-layer data packet.

According to the embodiments of the present disclosure, the transmitting end and the receiving end may each determine the protocol layer structure and/or protocol layer function to be used for the uplink/downlink data transmission in accordance with the configuration at the network side, and then transmit or receive the data in accordance with the determined protocol layer structure and/or protocol layer function. Because the data is transmitted or received by the transmitting end or the receiving end in accordance with the protocol layer structure and/or protocol layer function, it is able to provide an optimal protocol stack for a specific terminal at a specific scenario and achieve the data transmission in an efficient manner, thereby to achieve a better effect in terms of various aspects such as transmission efficiency, time delay, processing complexity, cost overhead and power consumption.

DETAILED DESCRIPTION OF THE EMBODIMENTS

According to the embodiments of the present disclosure, a transmitting end and a receiving end may each determine a protocol layer structure and/or protocol layer function to be used for uplink/downlink data transmission in accordance with a configuration at a network side, and then transmit or receive data in accordance with the determined protocol layer structure and/or protocol layer function. Because the data is transmitted or received by the transmitting end or the receiving end in accordance with the protocol layer structure and/or protocol layer function, it is able to provide an optimal protocol stack for a specific terminal at a specific scenario and achieve the data transmission in an efficient manner, thereby to achieve a better effect in terms of various aspects such as transmission efficiency, time delay, processing complexity, cost overhead and power consumption.

The present disclosure will be described hereinafter in more details in conjunction with the drawings and embodiments.

Figure 1:
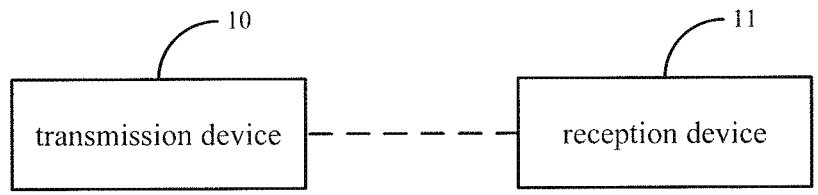
FIG. 1 is a schematic view showing a system for data transmission according to at least one embodiment of the present disclosure.

As shown in FIG. 1, the present disclosure provides in some embodiments a system for data transmission, which includes: a transmission device 10 configured to determine a protocol layer structure and/or a protocol layer function to be used for uplink/downlink data transmission in accordance with a configuration at a network side, the protocol layer structure and/or the protocol layer function configured at the network side being determined in accordance with a transmission requirement of a terminal, and transmit data in accordance with the determined protocol layer structure and/or protocol layer function; and a reception device 11 configured to determine the protocol layer structure and/or the protocol layer function to be used for the uplink/downlink data transmission in accordance with the configuration at the network side, and receive the data in accordance with the determined protocol layer structure and/or protocol layer function.

In the embodiments of the present disclosure, for the downlink transmission, the transmission device is a base station and the reception device is a terminal, and for the uplink transmission, the transmission device is a terminal and the reception device is a base station.

In a possible embodiment of the present disclosure, the transmission device and the reception device may be configured by a high-layer device (e.g., a base station, a local service center controlling a plurality of access devices, a core network device, a group server or an application server) at the network device. There are various configuration modes, as long as configuration information of the transmission device and the reception device may be kept consistent.

In the embodiments of the present disclosure, the protocol layer structure and/or protocol layer function to be used for the uplink/downlink data transmission may be configured for the transmission device and the reception device, which will be described hereinafter.

Case 1: Configuration of Protocol Layer Structure to be Used for Uplink/Downlink Data Transmission In the case of determining the protocol layer structure to be used for the uplink/downlink data transmission in accordance with the configuration at the network side, the transmission device may determine the protocol layer structure in accordance with the configuration at the network side as at least one of the followings protocol layers: a PDCP layer, an RLC layer and an MAC layer. In the case of transmitting the data in accordance with the determined protocol layer structure, the transmission device may organize data in accordance with the determined protocol layer structure, and transmit the organized data. Correspondingly, in the case of receiving the data in accordance with the determined protocol layer structure, the reception device may organize the data in accordance with the determined protocol layer structure, and perform restoration on the received data.

For case 1, a classification mode and layer functions of the PDCP layer, the RLC layer and the MAC layer in a LTE system may be adopted, and at the network side, a protocol stack type may be configured for the uplink/downlink data transmission in accordance with the transmission requirement of the terminal. For example, the protocol stack type may include merely the MAC layer, merely the PDCP layer and the MAC layer, merely the PDCP layer and the RLC layer, or merely the RLC layer and the MAC layer.

The transmission requirement of the terminal may include, but not limited to, at least one of the followings: a service type, a data packet size, a terminal type and an application scenario. In a possible embodiment of the present disclosure, the transmission device and the reception device may be configured through a high layer.

Some different configuration modes will be listed hereinafter.

Mode 1: there is Merely the MAC Layer

Figure 2:
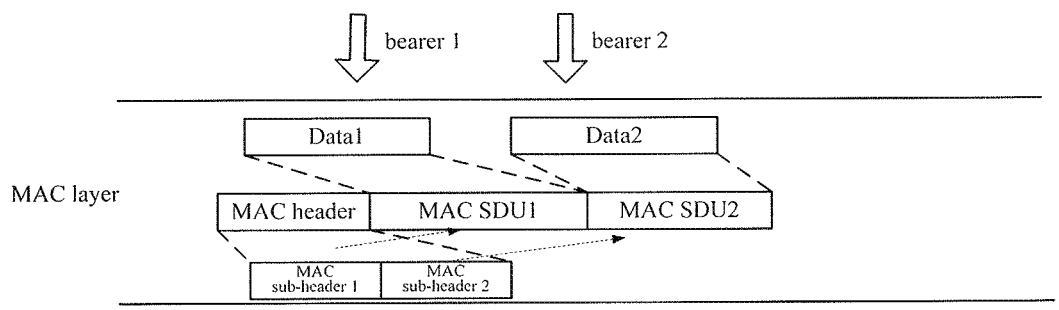
FIG. 2 is a schematic view showing an air-interface high-layer data organization mode according to at least one embodiment of the present disclosure.

In the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. In the case of organizing the data in accordance with the determined protocol layer structure, the transmission device may add an MAC header to a high-layer data packet through the MAC layer. Correspondingly, in the case of organizing the data in accordance with the determined protocol layer structure and performing restoration on the received data, the reception device may restore the high-layer data packet through the MAC layer in accordance with an MAC header indicator in the received data. FIG. 2 shows the mode 1.

The treatment and transmission of the data packet by the transmission device, and the reception and restoration of the data packet by the reception device will be described hereinafter.

Downlink Data Transmission:

The base station may add the MAC header to the high-layer data packet, and for the data from a plurality of service bearers, it may perform a bearer multiplexing operation on the data. The terminal may receive the data, and restore the high-layer data packet in accordance with the MAC header indicator.

Uplink Data Transmission:

The terminal may add the MAC header to the high-layer data packet, and for the data from a plurality of service bearers, it may perform a multiplexing operation on the data. The base station may receive the data, and restore the high-layer data packet in accordance with the MAC header indicator.

For the downlink data transmission, the terminal having the above-mentioned transmission requirements may be a Machine Type Communication (MTC) application terminal capable of receiving an operation command (e.g., an actuator, an accelerator, a braking device or a mechanical arm as the MTC terminal). For the uplink data transmission, the terminal having the above-mentioned transmission requirements may be a terminal capable of reporting a small data packet containing timing monitoring information (e.g., periodically reporting a safety indicator in a smart grid).

Mode 2: there are Merely the PDCP Layer and the MAC Layer

Figure 3:
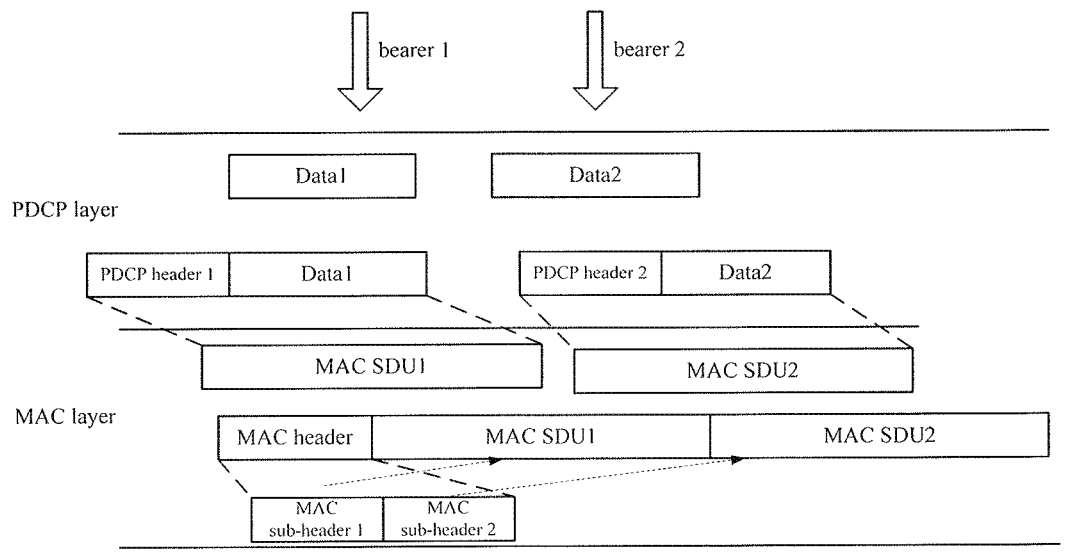
FIG. 3 is another schematic view showing the air-interface high-layer data organization mode according to at least one embodiment of the present disclosure.

In the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. In the case of organizing the data in accordance with the determined protocol layer structure, the transmission device may perform header compression and encryption operations on a high-layer data packet through the PDCP layer, add a PDCP header to obtain a PDCP PDU, perform treatment on the PDCP PDU through the MAC layer, and add an MAC header to the treated PDCP PDU. Correspondingly, in the case of organizing the data in accordance with the determined protocol layer structure and performing restoration on the received data, the reception device may restore the PDCP PDU through the MAC layer in accordance with an MAC header indicator in the received data, remove a PDCP header from the PDCP PDU through the PDCP layer, perform decryption and header decompression operations, and restore the high-layer data packet. FIG. 3 shows the mode 2.

The treatment and transmission of the data packet by the transmission device, and the reception and restoration of the data packet by the reception device will be described hereinafter.

Downlink Data Transmission:

The base station may perform header compression and encryption operations on the high-layer data packet, add the PDCP header, perform treatment on the PDCP PDU from the PDCP layer through the MAC layer and add the MAC header, and for the data from a plurality of service bearers, it may perform a bearer multiplexing operation. The terminal may receive the data from a physical layer, restore the PDCP PDU in accordance with the MAC header indicator, remove the PDCP header from the PDCP PDU, perform decryption and header decompression operations, and restore the high-layer data packet.

Uplink Data Transmission:

The terminal may perform header compression and encryption operations on the high-layer data packet, add the PDCP header, perform treatment on the PDCP PDU from the PDCP layer through the MAC layer and add the MAC header, and for the data from a plurality of service bearers, it may perform a bearer multiplexing operation. The base station may receive the data from a physical layer, restore the PDCP PDU in accordance with the MAC header indicator, remove the PDCP header from the PDCP PDU, perform decryption and header decompression operations, and restore the high-layer data packet.

For the downlink data transmission, the terminal having the above-mentioned transmission requirements may be an MTC application terminal capable of receiving data information (e.g., an actuator of the MTC terminal, or an on-board terminal capable of receiving information from an Internet of Vehicle). For the uplink data transmission, the terminal having the above-mentioned transmission requirements may be a terminal capable of reporting sampling information about a small data packet or emergency information.

Mode 3: there are Merely the PDCP Layer and the RLC Layer

Figure 4:
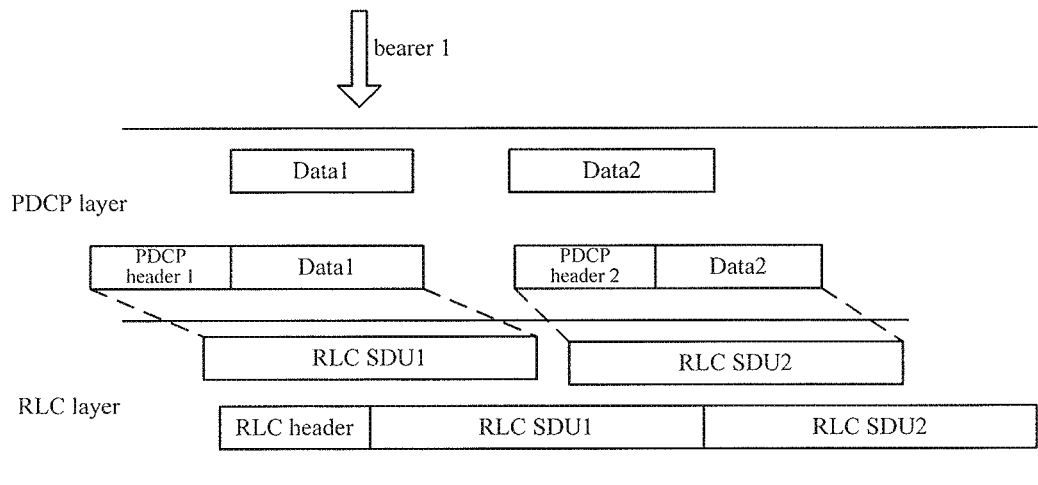
FIG. 4 is yet another schematic view showing the air-interface high-layer data organization mode according to at least one embodiment of the present disclosure.

In the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. In the case of organizing the data in accordance with the determined protocol layer structure, if the PDCP layer and the RLC layer are used for the uplink/downlink data transmission, the transmission device may perform header compression and encryption operations on a high-layer data packet through the PDCP layer, add a PDCP header to obtain a PDCP PDU, perform treatment on the PDCP PDU through the RLC layer, and add an RLC header to the treated PDCP PDU. Correspondingly, in the case of organizing the data in accordance with the determined protocol layer structure and performing restoration on the received data, the reception device may restore the PDCP PDU through the RLC layer in accordance with an RLC header indicator in the received data, remove the PDCP header from the PDCP PDU through the PDCP layer, perform decryption and header decompression operations, and restore the high-layer data packet. FIG. 4 shows the mode 3.

The treatment and transmission of the data packet by the transmission device, and the reception and restoration of the data packet by the reception device will be described hereinafter.

Downlink Data Transmission:

The base station may perform header compression and encryption operations on the high-layer data packet, add the PDCP header, perform treatment (e.g., a segmentation or concatenating operation) on the PDCP PDU from the PDCP layer through the RLC layer, and add the RLC header. The terminal may receive data from a physical layer, restore the PDCP PDU in accordance with the RLC header indicator, remove the PDCP header from the PDCP PDU, perform decryption and header decompression operations, and restore the high-layer data packet.

Uplink Data Transmission:

The terminal may perform header compression and encryption operations on the high-layer data packet, add the PDCP header, perform treatment (e.g., a segmentation or concatenating operation) on the PDCP PDU from the PDCP layer through the RLC layer, and add the RLC header. The base station may receive data from a physical layer, restore the PDCP PDU in accordance with the RLC header indicator, remove the PDCP header from the PDCP PDU, perform decryption and header decompression operations, and restore the high-layer data packet.

For the downlink data transmission, the terminal having the above-mentioned transmission requirements may be a terminal capable of receiving single service data (e.g., a specific actuator of an MTC terminal, or an on-board terminal capable of receiving single data information). For the uplink data transmission, the terminal having the above-mentioned transmission requirements may be a terminal capable of reporting service data of a specific type (e.g., a sensor for collecting specific information).

Mode 4: there are Merely the RLC Layer and the MAC Layer

Figure 5:
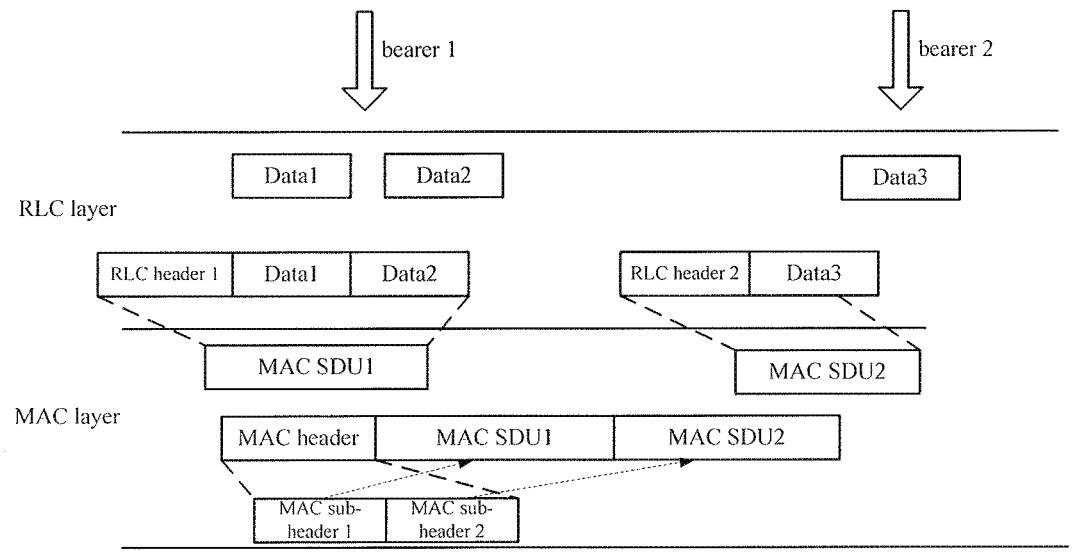
FIG. 5 is still yet another schematic view showing the air-interface high-layer data organization mode according to at least one embodiment of the present disclosure.

In the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. In the case of organizing the data in accordance with the determined protocol layer structure, if the RLC layer and the MAC layer are used for the uplink/downlink data transmission, the transmission device may perform treatment on a high-layer data packet through the RLC layer in accordance with a data volume capable of being supported by a transmission resource, add an RLC header to obtain an RLC PDU, perform treatment on the RLC PDU through the MAC layer, and add an MAC header to the treated RLC PDU. Correspondingly, in the case of organizing the data in accordance with the determined protocol layer structure and performing restoration on the received data, the reception device may restore the RLC PDU through the MAC layer in accordance with an MAC header indicator in the received data, remove the RLC header from the RLC PDU through the RLC layer, and restore the high-layer data packet from a data segment acquired after segmentation and concatenating operations in accordance with the RLC header indicator. FIG. 5 shows the mode 4.

The treatment and transmission of the data packet by the transmission device, and the reception and restoration of the data packet by the reception device will be described hereinafter.

Downlink Data Transmission:

The base station may perform treatment (e.g., segmentation and concatenating operations) on the high-layer data packet in accordance with the data volume capable of being supported by the transmission resource, add the RLC header, perform treatment on the RLC PDU from the RLC layer through the MAC layer, and add the MAC header, and for the data from a plurality of service bearers, it may perform a bearer multiplexing operation. The terminal may receive the data from a physical layer, restore the RLC PDU in accordance with the MAC header indicator, remove the RLC header from the RLC PDU, and restore the high-layer data packet from a data segment acquired after the segmentation and concatenating operations in accordance with the RLC header indicator.

Uplink Data Transmission:

The terminal may perform treatment (e.g., segmentation and concatenating operations) on the high-layer data packet in accordance with the data volume capable of being supported by the transmission resource, add the RLC header, perform treatment on the RLC PDU from the RLC layer through the MAC layer, and add the MAC header, and for the data from a plurality of service bearers, it may perform a bearer multiplexing operation. The base station may receive the data from a physical layer, restore the RLC PDU in accordance with the MAC header indicator, remove the RLC header from the RLC PDU, and restore the high-layer data packet from a data segment acquired after the segmentation and concatenating operations in accordance with the RLC header indicator.

For the downlink data transmission, the terminal having the above-mentioned transmission requirements may be a terminal within a local network (e.g., a private network) or a terminal capable of receiving public information. For the uplink data transmission, the terminal having the above-mentioned transmission requirements may be a terminal within a local network (e.g., a private network).

Case 2: Configuration of Protocol Layer Function to be Used for Uplink/Downlink Data Transmission In the case of determining the protocol layer function to be used for the uplink/downlink data transmission in accordance with the configuration at the network side, the transmission device may determine the protocol layer function in accordance with the configuration at the network side as at least one of the followings: a data packet concatenating function, a header compression function, a header encryption function and a multiplexing function. In the case of transmitting the data in accordance with the determined protocol layer function, the transmission device may organize the data in accordance with the determined protocol layer function, and transmit the organized data. Correspondingly, in the case of receiving the data in accordance with the determined protocol layer function, the reception device may organize the data in accordance with the determined protocol layer function, and perform restoration on the received data.

For case 2, the functions capable of being supported by an air-interface protocol stack may be configured, and the data may be organized in accordance with the configured functions and then transmitted. In other words, an air-interface PDU structure may be organized in accordance with the function configurations and the function requirements, and then a corresponding data header may be added. For example, in the case that a specific terminal merely supports the transmission of certain service data (a small data packet), the data packet concatenating function may be configured for the air-interface data organization and transmission. In the case of organizing the PDU, it is merely necessary to concatenate a plurality of data packets and add a protocol layer header. In a possible embodiment of the present disclosure, the transmission device and the reception device may be configured through a high layer.

Some different configuration modes in the case 2 will be listed hereinafter.

Mode 1: the Air-Interface Protocol Stack is Merely Configured to Support the Data Packet Concatenating Function The transmission device may perform a concatenating operation on the high-layer data packets, organize the concatenated high-layer data packets into a specific protocol layer, and add a specific protocol layer packet header. Correspondingly, the reception device may restore the high-layer data packets in accordance with the specific protocol layer packet header indicator in the received data. The specific protocol layer is a protocol layer capable of supporting the data packet concatenating function, and the specific protocol layer packet header includes a domain for indicating information about a parameter of the high-layer data packet.

Figure 6:
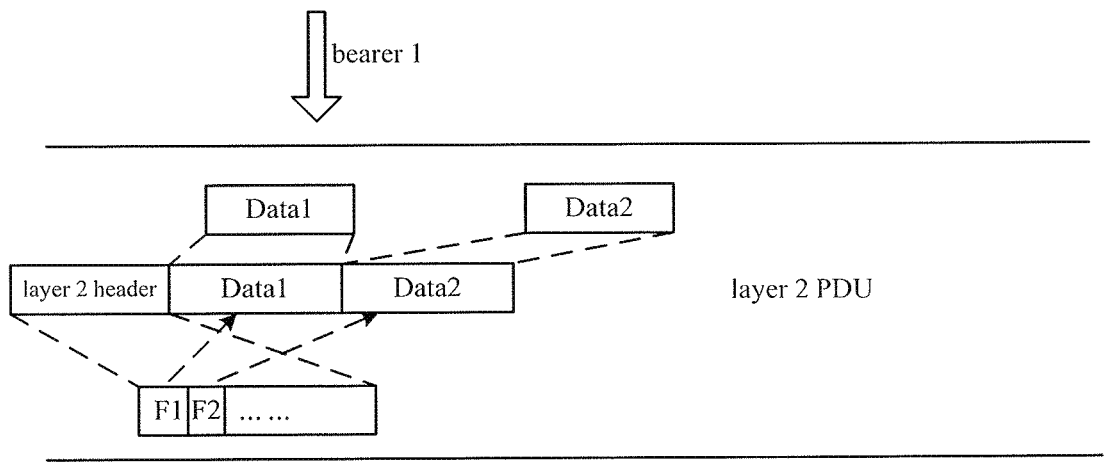
FIG. 6 is still yet another schematic view showing the air-interface high-layer data organization mode according to at least one embodiment of the present disclosure.

The organization of the concatenated high-layer data packets into the specific protocol layer may include forming the treated data into a data section for the specific protocol layer, and adding a specific protocol layer header identifier, so as to form a PDU for the specific protocol layer (the organization procedure occurring hereinafter has a similar meaning, merely with different layers into which the high-layer data packets are organized). FIG. 6 shows the mode 1. In the following, the specific protocol layer is called as layer 2, which may also be named in other ways according to the practical need.

The transmission device may concatenate the data, add a layer 2 header, so as to indicate a data domain. The layer 2 header may include domains for indicating different high-layer data packets, i.e., F1 and F2 in FIG. 6.

Downlink Data Transmission:

The base station may concatenate the high-layer data packets, organize the concatenated high-layer data packets into a layer 2 PDU, and add a layer PDU header. The layer 2 PDU header may include a domain for indicating information about each high-layer data packet, e.g., a serial number and a length of the high-layer data packet. This layer 2 PDU may probably be called as an MAC PDU, but its function and organization mode are different from those of the LTE MAC PDU. The terminal may receive the data from a physical layer, and restore the high-layer data packets in accordance with a layer 2 PDU header indicator.

Uplink Data Transmission:

The terminal may concatenate the high-layer data packets, organize the concatenated high-layer data packets into the layer 2 PDU, and add the layer PDU header. The layer 2 PDU header may include a domain for indicating information about each high-layer data packet, e.g., a serial number and a length of the high-layer data packet. This layer 2 PDU may probably be called as an MAC PDU, but its function and organization mode are different from those of the LTE MAC PDU. The base station may receive the data from a physical layer, and restore the high-layer data packets in accordance with a layer 2 PDU header indicator.

Mode 2: the Air-Interface Protocol Stack is Configured to Support the Header Compression, Encryption and Data Packet Concatenating Functions.

Figure 7:
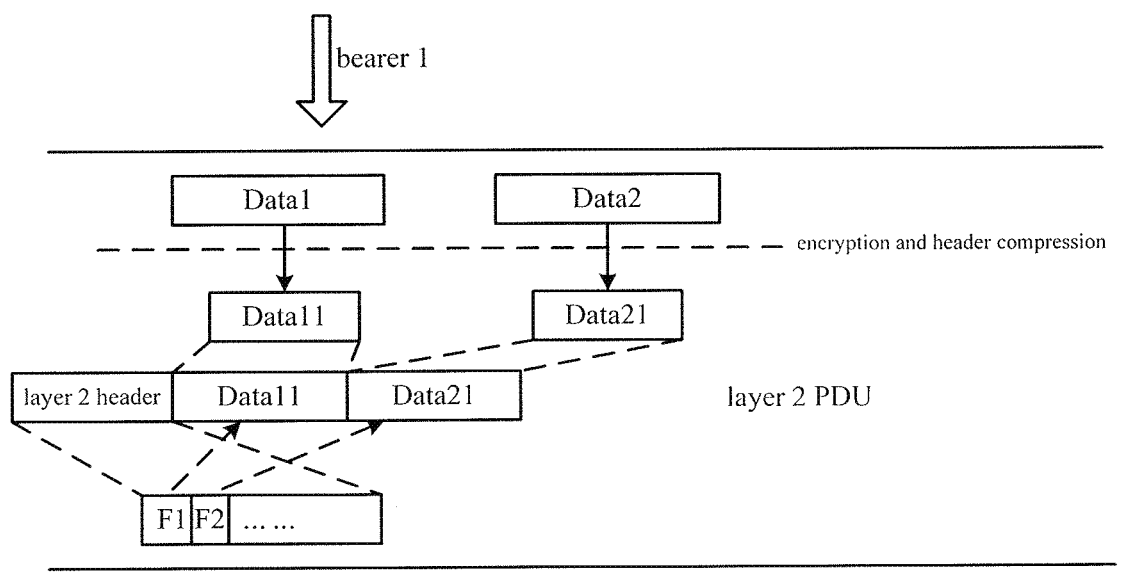
FIG. 7 is still yet another schematic view showing the air-interface high-layer data organization mode according to at least one embodiment of the present disclosure.

In the case that the protocol layer function to be used for the uplink/downlink data transmission includes the header compression, encryption and data concatenating functions, the transmission device may perform encryption and header compression operations on the high-layer data packets, perform a concatenating operation on the treated high-layer data packets, organize the concatenated high-layer data packets into a specific protocol layer, and add a specific protocol layer packet header. Correspondingly, in the case that the protocol layer function to be used for the uplink/downlink data transmission includes the header compression, encryption and data packets concatenating functions, the reception device may perform restoration on the data on which the encryption and header compression operations have been performed in accordance with the specific protocol layer packet header indicator in the received data, perform decryption and header decompression operations on the data, and restore the high-layer data packets. The specific protocol layer is a protocol layer capable of supporting the data packet concatenating function, and the specific protocol layer packet header includes a domain for indicating information about a parameter of the high-layer data packet. FIG. 7 shows the mode 2. In the following, the specific protocol layer may be called as layer 2, which may also be named in any other ways according to the practical need.

The transmission device may perform encryption and header compression operations on the data, organize the treated data into a data domain of a layer 2 PDU, and add a layer 2 header to indicate the data domain. The layer 2 header may include domains for indicating different high-layer data packets, i.e., F1 and F2 in FIG. 7.

Downlink Data Transmission:

The base station may perform encryption and header compression operations on the high-layer data packets, organize the treated high-layer data packets into a layer 2 PDU, and add a layer 2 PDU header. The layer 2 PDU header may include a domain for indicating information about the data on which the encryption and header compression operations have been performed, e.g., a serial number and a length of the data. This layer 2 PDU may probably be called as an MAC PDU, but its function and organization mode are different from those of the LTE MAC PDU. The terminal may receive the data from a physical layer, and restore the data on which the encryption and header compression operations have been performed in accordance with a layer 2 PDU header indicator, perform decryption and header decompression operations on the data, and restore the high-layer data packets.

Uplink Data Transmission:

The terminal may perform encryption and header compression operations on the high-layer data packets, organize the treated high-layer data packets into a layer 2 PDU, and add a layer 2 PDU header. The layer 2 PDU header may include a domain for indicating information about the data on which the encryption and header compression operations have been performed, e.g., a serial number and a length of the data. This layer 2 PDU may probably be called as an MAC PDU, but its function and organization mode are different from those of the LTE MAC PDU. The base station may receive the data from a physical layer, and restore the data on which the encryption and header compression operations have been performed in accordance with a layer 2 PDU header indicator, perform decryption and header decompression operations on the data, and restore the high-layer data packets.

Figure 8:
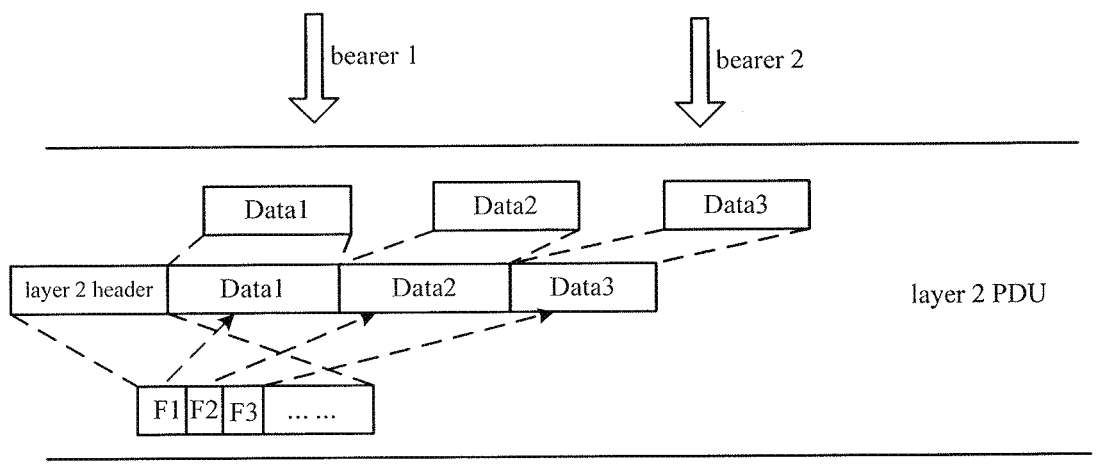
FIG. 8 is still yet another schematic view showing the air-interface high-layer data organization mode according to at least one embodiment of the present disclosure.

Mode 3: the Air-Interface Protocol Stack is Configured to Merely Support the Concatenating Function and the Bearer Multiplexing Function In the case that the protocol layer function to be used for the uplink/downlink data transmission includes the data packet concatenating function and the bearer multiplexing function, the transmission device may perform data packet concatenating and bearer multiplexing operations on the high-layer data packets, perform a concatenating operation on the treated high-layer data packets, organize the concatenated high-layer data packets into a specific protocol layer, and add a specific protocol layer packet header. Correspondingly, in the case that the protocol layer function to be used for the uplink/downlink data transmission includes the data packet concatenating function and the bearer multiplexing function, the reception device may restore the high-layer data packets in accordance with the specific protocol layer packet header indicator in the received data. The specific protocol layer is a protocol layer capable of supporting the data packet concatenating function, and the specific protocol layer packet header includes a domain for indicating information about a parameter of the high-layer data packet. FIG. 8 shows the mode 3. In the following, the specific protocol layer may be called as layer 2, which may also be named in any other ways according to the practical need.

The transmission device may concatenate the data packets from an identical bearer, multiplex the data packets from different bearers, and add a layer 2 header to indicate a data domain. The layer 2 header may include domains for indicating different high-layer data packets, i.e., F1, F2 and F3 in FIG. 8.

Downlink Data Transmission:

The base station may perform concatenating and multiplexing operations on the high-layer data packets, organize the treated high-layer data packets into a layer 2 PDU, and add a layer 2 PDU header. The layer 2 PDU header may include a domain for indicating information about each high-layer data packet, e.g., a serial number and a length of the high-layer data packet. This layer 2 PDU may probably be called as an MAC PDU, but its function and organization mode are different from those of the LTE MAC PDU. The terminal may receive the data from a physical layer, and restore the high-layer data packets in accordance with a layer 2 PDU header indicator.

Uplink Data Transmission:

The terminal may perform concatenating and bearer multiplexing operations on the high-layer data packets, organize the treated high-layer data packets into a layer 2 PDU, and add a layer 2 PDU header. The layer 2 PDU header may include a domain for indicating information about each high-layer data packet, e.g., a serial number and a length of the high-layer data packet. This layer 2 PDU may probably be called as an MAC PDU, but its function and organization mode are different from those of the LTE MAC PDU. The base station may receive the data from a physical layer, and restore the high-layer data packets in accordance with a layer 2 PDU header indicator.

Figure 9:
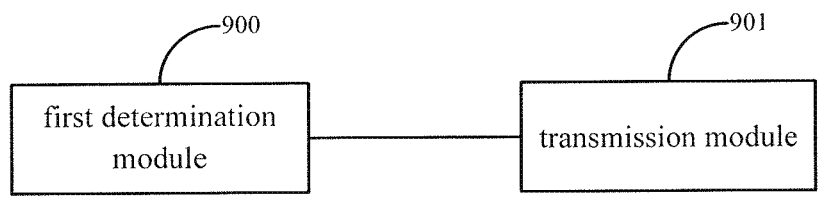
FIG. 9 is a schematic view showing a transmission device according to at least one embodiment of the present disclosure.

As shown in FIG. 9, the present disclosure provides in some embodiments a transmission device, which includes: a first determination module 900 configured to determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and a transmission module 901 configured to transmit data in accordance with the determined protocol layer structure and/or protocol layer function.

In a possible embodiment of the present disclosure, the first determination module 900 is further configured to determine the protocol layer structure to be used for the uplink/downlink data transmission in accordance with the configuration at the network side as at least one of the followings protocol layers: a PDCP layer, an RLC layer and an MAC layer, and the transmission module 901 is further configured to organize the data in accordance with the determined protocol layer structure and transmit the organized data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The transmission module 901 is further configured to add an MAC header to a high-layer data packet through the MAC layer.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The transmission module 901 is further configured to perform header compression and encryption operations on a high-layer data packet through the PDCP layer, add a PDCP header to obtain a PDCP PDU, perform treatment on the PDCP PDU through the MAC layer, and add an MAC header to the treated PDCP PDU.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The transmission module 901 is further configured to perform header compression and encryption operations on a high-layer data packet through the PDCP layer, add a PDCP header to obtain a PDCP PDU, perform treatment on the PDCP PDU through the RLC layer, and add an RLC header to the treated PDCP PDU.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The transmission module 901 is further configured to perform treatment on a high-layer data packet through the RLC layer in accordance with a data volume capable of being supported by a transmission resource, add an RLC header to obtain an RLC PDU, perform treatment on the RLC PDU through the MAC layer, and add an MAC header to the treated RLC PDU.

In a possible embodiment of the present disclosure, the first determination module 900 is further configured to determine the protocol layer function to be used for the uplink/downlink data transmission in accordance with the configuration at the network side as at least one of the followings: a data packet concatenating function, a header compression function, a header encryption function and a multiplexing function. The transmission module 901 is further configured to organize the data in accordance with the determined protocol layer function, and transmit the organized data.

In a possible embodiment of the present disclosure, the transmission module 901 is further configured to: in the case that the protocol layer function to be used for the uplink/downlink data transmission includes the data packet concatenating function, perform a concatenating operation on high-layer data packets, and organize the concatenated high-layer data packets into a specific protocol layer and add a specific protocol layer packet header; or in the case that the protocol layer function to be used for the uplink/downlink data transmission includes the header compression function, the encryption function and the data packet concatenating function, perform encryption and header compression on high-layer data packets, perform a concatenating operation on the resultant high-layer data packets, organize the concatenated high-layer data packets into a specific protocol layer and add a specific protocol layer packet header; or in the case that the protocol layer function to be used for the uplink/downlink data transmission includes the data packet concatenating function and the bear multiplexing function, perform concatenating and bearer multiplexing operations on the high-layer data packets, perform a concatenating operation on the resultant high-layer data packets, organize the concatenated high-layer data packets into a specific protocol layer and add a specific protocol layer packet header. The specific protocol layer is a protocol layer capable of supporting the data packet concatenating function, and the specific protocol layer packet header includes a domain for indicating information about a parameter of the high-layer data packet.

Figure 10:
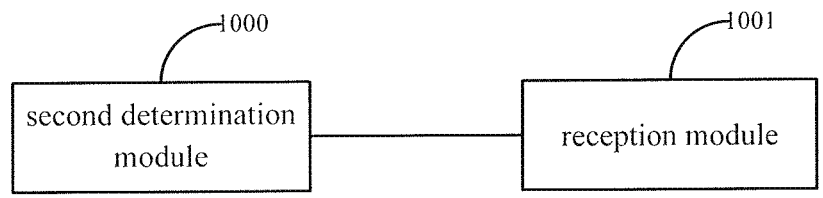
FIG. 10 is a schematic view showing a reception device according to at least one embodiment of the present disclosure.

As shown in FIG. 10, the present disclosure provides in some embodiments a reception device, including: a second determination module 1000 configured to determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and a reception module

1001 configured to receive data in accordance with the determined protocol layer structure and/or protocol layer function.

In a possible embodiment of the present disclosure, the second determination module 1000 is further configured to determine the protocol layer structure to be used for the uplink/downlink data transmission in accordance with the configuration at the network side as at least one of the followings protocol layers: a PDCP layer, an RLC layer and an MAC layer, and the reception module 1001 is further configured to organize the data in accordance with the determined protocol layer structure, and perform restoration on the received data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The reception module 1001 is further configured to restore a high-layer data packet through the MAC layer in accordance with an MAC header indicator in the received data.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The reception module 1001 is further configured to restore a PDCP PDU through the MAC layer in accordance with an MAC header indicator in the received data, remove a PDCP header from the PDCP PDU through the PDCP layer, perform decryption and header decompression, and restore the high-layer data packet.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The reception module 1001 is further configured to restore a PDCP PDU through the RLC layer in accordance with an RLC header indicator in the received data, remove a PDCP header from the PDCP PDU through the PDCP layer, perform decryption and header decompression, and restore the high-layer data packet.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The reception module 1001 is further configured to restore an RLC PDU through the MAC layer in accordance with an MAC header indicator in the received data, remove an RLC header from the RLC PDU through the RLC layer, and restore the high-layer data packet from concatenated data segments in accordance with an RLC header indicator.

In a possible embodiment of the present disclosure, the second determination module 1000 is further configured to determine the protocol layer function to be used for the uplink/downlink data transmission in accordance with the configuration at the network side as at least one of the followings: a data packet concatenating function, a header compression function, a header encryption function and a multiplexing function. The reception module 1001 is further configured to organize the data in accordance with the determined protocol layer function and perform restoration on the received data.

In a possible embodiment of the present disclosure, the reception module 1001 is further configured to: in the case that the protocol layer function to be used for the uplink/downlink data transmission includes the data packet concatenating function, restore high-layer data packets in accordance with a specific protocol layer packet header indicator in the received data; or in the case that the protocol layer function to be used for the uplink/downlink data transmission includes the header compression function, the encryption function and the data packet concatenating function, restore the data on which encryption and header compression operations have been performed in accordance with a specific protocol layer packet header indicator in the received data, perform decryption and header decompression operations on the data, and restore the high-layer data packets; or in the case that the protocol layer function to be used for the uplink/downlink data transmission includes the data packet concatenating function and the bearer multiplexing function, restore the high-layer data packets in accordance with a specific protocol layer packet header indicator in the received data. The specific protocol layer is a protocol layer capable of supporting the data packet concatenating function, and the specific protocol layer packet header includes a domain for indicating information about a parameter of the high-layer data packet.

Figure 11:
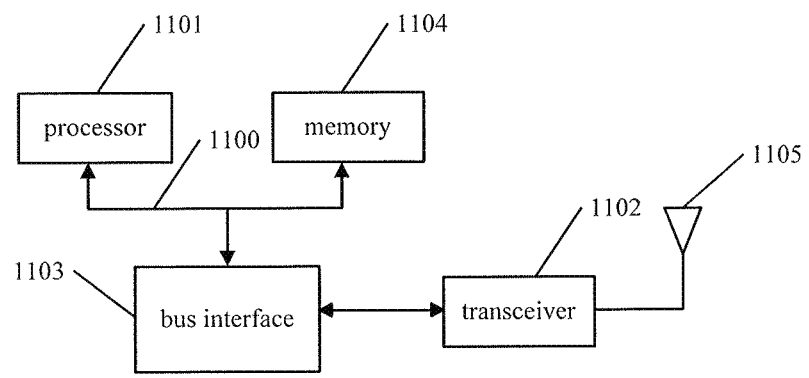
FIG. 11 is another schematic view showing the transmission device according to at least one embodiment of the present disclosure.

As shown in FIG. 11, the present disclosure provides in some embodiments a transmission device, including a processor 1101, a transceiver 1102 and a memory 1104. The processor 1101 is configured to read a program stored in the memory 1104, so as to: determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and transmit through the transceiver 1102 data in accordance with the determined protocol layer structure and/or protocol layer function. The transceiver 1102 is configured to receive and transmit data under the control of the processor 1101.

In a possible embodiment of the present disclosure, the processor 1101 is further configured to: determine the protocol layer structure to be used for the uplink/downlink data transmission in accordance with the configuration at the network side as at least one of the followings protocol layers: a PDCP layer, an RLC layer and an MAC layer; and organize the data in accordance with the determined protocol layer structure and transmit the organized data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The processor 1101 is further configured to add an MAC header to a high-layer data packet through the MAC layer.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The processor 1101 is further configured to perform header compression and encryption operations on a high-layer data packet through the PDCP layer, add a PDCP header to obtain a PDCP PDU, perform treatment on the PDCP PDU through the MAC layer, and add an MAC header to the treated PDCP PDU.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The processor 1101 is further configured to perform header compression and encryption operations on a high-layer data packet through the PDCP layer, add a PDCP header to obtain a PDCP PDU, perform treatment on the PDCP PDU through the RLC layer, and add an RLC header to the treated PDCP PDU.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The processor 1101 is further configured to perform treatment on a high-layer data packet through the RLC layer in accordance with a data volume capable of being supported by a transmission resource, add an RLC header to obtain an RLC PDU, perform treatment on the RLC PDU through the MAC layer, and add an MAC header to the treated RLC PDU.

In a possible embodiment of the present disclosure, the processor 1101 is further configured to: determine the protocol layer function to be used for the uplink/downlink data transmission in accordance with the configuration at the network side as at least one of the followings: a data packet concatenating function, a header compression function, a header encryption function and a multiplexing function; and organize the data in accordance with the determined protocol layer function, and transmit the organized data.

In a possible embodiment of the present disclosure, the processor 1101 is further configured to: in the case that the protocol layer function to be used for the uplink/downlink data transmission includes the data packet concatenating function, perform a concatenating operation on high-layer data packets, and organize the concatenated high-layer data packets into a specific protocol layer and add a specific protocol layer packet header; or in the case that the protocol layer function to be used for the uplink/downlink data transmission includes the header compression function, the encryption function and the data packet concatenating function, perform encryption and header compression on high-layer data packets, perform a concatenating operation on the resultant high-layer data packets, organize the concatenated high-layer data packets into a specific protocol layer and add a specific protocol layer packet header; or in the case that the protocol layer function to be used for the uplink/downlink data transmission includes the data packet concatenating function and the bearer multiplexing function, perform concatenating and multiplexing operations on the high-layer data packets, perform a concatenating operation on the resultant high-layer data packets, organize the concatenated high-layer data packets into a specific protocol layer and add a specific protocol layer packet header. The specific protocol layer is a protocol layer capable of supporting the data packet concatenating function, and the specific protocol layer packet header includes a domain for indicating information about a parameter of the high-layer data packet.

In FIG. 11, a bus architecture is represented by a bus 1100, which may include a number of buses and bridges connected to each other, so as to connect various circuits for one or more processors such as a processor 1101 and one or more memories such as a memory 1104. In addition, as is known in the art, the bus 1100 may be used to further connect various other circuits, such as a circuit for a peripheral device, a circuit for a voltage stabilizer and a power management circuit, which will not be further explained herein. Bus interfaces 1103 are provided between the bus 1100 and the transceiver 1102, and the transceiver 1102 may consist of one or more elements, e.g. a plurality of transmitters and a plurality of receivers for communication with various other devices over a transmission medium. Data processed by the processor 1101 may be transmitted over a wireless medium through an antenna 1105. The antenna 1105 may be further configured to receive data and transmit the data to the processor 1101.

The processor 1101 may take charge of managing the bus 1100 as well as general processings, and may further provide various functions such as timing, peripheral interfacing, voltage adjustment, power source management and any other control functions. The memory 1104 may store therein data desired for the operation of the processor 1101.

In a possible embodiment of the present disclosure, the processor 1101 may be a Central Processing Unit (CPU), an Application Specific Integrated Circuit (ASIC), a Field-Programmable Gate Array (FPGA) or a Complex Programmable Logic Device (CPLD).

Figure 12:
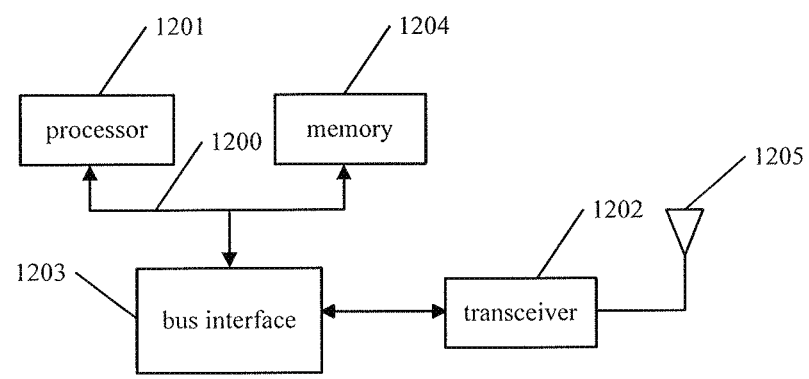
FIG. 12 is another schematic view showing the reception device according to at least one embodiment of the present disclosure.

As shown in FIG. 12, the present disclosure provides in some embodiments a reception device, including a processor 1201, a transceiver 1202 and a memory 1204. The processor 1201 is configured to read a program stored in the memory 1204, so as to: determine a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and receive through the transceiver 1202 data in accordance with the determined protocol layer structure and/or protocol layer function. The transceiver 1202 is configured to receive and transmit data under the control of the processor 1201.

In a possible embodiment of the present disclosure, the processor 1201 is further configured to: determine the protocol layer structure to be used for the uplink/downlink data transmission in accordance with the configuration at the network side as at least one of the followings protocol layers: a PDCP layer, an RLC layer and an MAC layer; and organize the data in accordance with the determined protocol layer structure, and perform restoration on the received data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The processor 1201 is further configured to restore a high-layer data packet through the MAC layer in accordance with an MAC header indicator in the received data.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The processor 1201 is further configured to restore a PDCP PDU through the MAC layer in accordance with an MAC header indicator in the received data, remove a PDCP header from the PDCP PDU through the PDCP layer, perform decryption and header decompression, and restore the high-layer data packet.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The processor 1201 is further configured to restore a PDCP PDU through the RLC layer in accordance with an RLC header indicator in the received data, remove a PDCP header from the PDCP PDU through the PDCP layer, perform decryption and header decompression, and restore the high-layer data packet.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The processor 1201 is further configured to restore an RLC PDU through the MAC layer in accordance with an MAC header indicator in the received data, remove an RLC header from the RLC PDU through the RLC layer, and restore the high-layer data packet from concatenated data segments in accordance with an RLC header indicator.

In a possible embodiment of the present disclosure, the processor 1201 is further configured to: determine the protocol layer function to be used for the uplink/downlink data transmission in accordance with the configuration at the network side as at least one of the followings: a data packet concatenating function, a header compression function, a header encryption function and a multiplexing function; and organize the data in accordance with the determined protocol layer function and perform restoration on the received data.

In a possible embodiment of the present disclosure, the processor 1201 is further configured to: in the case that the protocol layer function to be used for the uplink/downlink data transmission includes the data packet concatenating function, restore high-layer data packets in accordance with a specific protocol layer packet header indicator in the received data; or in the case that the protocol layer function to be used for the uplink/downlink data transmission includes the header compression function, the encryption function and the data packet concatenating function, restore the data on which encryption and header compression operations have been performed in accordance with a specific protocol layer packet header indicator in the received data, perform decryption and header decompression operations on the data, and restore the high-layer data packets; or in the case that the protocol layer function to be used for the uplink/downlink data transmission includes the data packet concatenating function and the multiplexing function, restore the high-layer data packets in accordance with a specific protocol layer packet header indicator in the received data. The specific protocol layer is a protocol layer capable of supporting the data packet concatenating function, and the specific protocol layer packet header includes a domain for indicating information about a parameter of the high-layer data packet.

In FIG. 12, a bus architecture is represented by a bus 1200, which may include a number of buses and bridges connected to each other, so as to connect various circuits for one or more processors such as a processor 1201 and one or more memories such as a memory 1204. In addition, as is known in the art, the bus 1200 may be used to further connect various other circuits, such as a circuit for a peripheral device, a circuit for a voltage stabilizer and a power management circuit, which will not be further explained herein. Bus interfaces 1203 are provided between the bus 1200 and the transceiver 1202, and the transceiver 1202 may consist of one or more elements, e.g. a plurality of transmitters and a plurality of receivers for communication with various other devices over a transmission medium. Data processed by the processor 1201 may be transmitted over a wireless medium through an antenna 1205. The antenna 1205 may be further configured to receive data and transmit the data to the processor 1201.

The processor 1201 may take charge of managing the bus 1200 as well as general processings, and may further provide various functions such as timing, peripheral interfacing, voltage adjustment, power source management and any other control functions. The memory 1204 may store therein data desired for the operation of the processor 1201.

In a possible embodiment of the present disclosure, the processor 1201 may be a CPU, an ASIC, an FPGA or a CPLD.

Based on an identical inventive concept, the present disclosure further provides in some embodiments a method for data transmission. A device corresponding to this method is just the device in the above-mentioned system for data transmission through channels, and a principle for solving the problem by the method is similar to that for solving the problem by the device mentioned above, so the implementation of the method may refer to that of the system, which will not be particularly defined herein.

Figure 13:
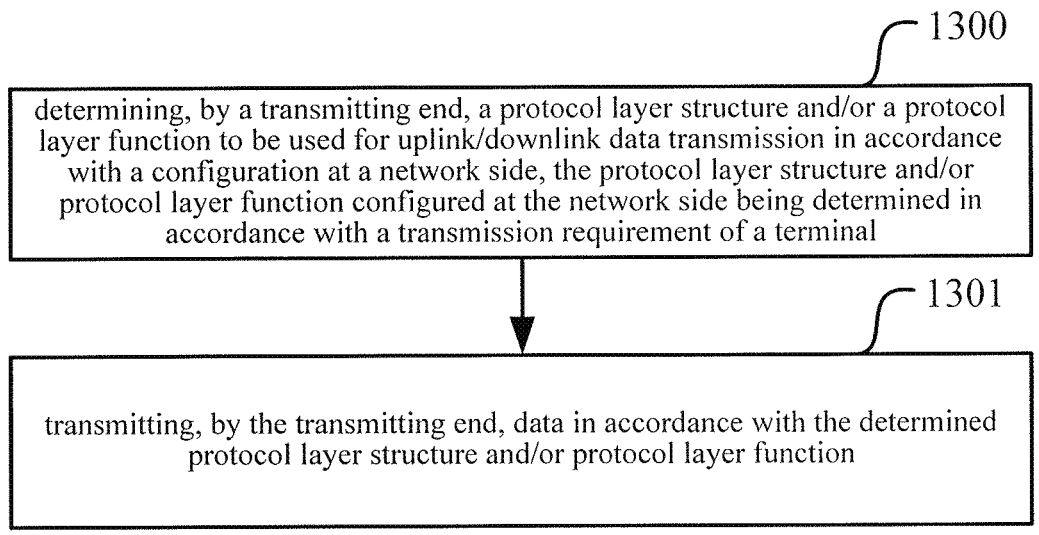
FIG. 13 is a flow chart of a method for data transmission according to at least one embodiment of the present disclosure.

As shown in FIG. 13, the present disclosure provides in some embodiments a method for data transmission, including: Step 1300 of determining, by a transmitting end, a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and Step 1301 of transmitting, by the transmitting end, data in accordance with the determined protocol layer structure and/or protocol layer function.

In a possible embodiment of the present disclosure, the step of determining, by the transmitting end, the protocol layer structure to be used for the uplink/downlink data transmission in accordance with the configuration at the network side includes: determining, by the transmitting end, the protocol layer structure to be used for the uplink/downlink data transmission in accordance with the configuration at the network side as at least one of the followings protocol layers: a PDCP layer, an RLC layer and an MAC layer, and the step of transmitting, by the transmitting end, the data in accordance with the determined protocol layer structure includes: organizing, by the transmitting end, the data in accordance with the determined protocol layer structure and transmitting the organized data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the transmitting end, the data in accordance with the determined protocol layer structure includes: adding, by the transmitting end, an MAC header to a high-layer data packet through the MAC layer.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the transmitting end, the data in accordance with the determined protocol layer structure includes: performing, by the transmitting end, header compression and encryption operations on a high-layer data packet through the PDCP layer, adding a PDCP header to obtain a PDCP PDU, performing treatment on the PDCP PDU through the MAC layer, and adding an MAC header to the treated PDCP PDU.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The step of organizing, by the transmitting end, the data in accordance with the determined protocol layer structure includes: performing, by the transmitting end, header compression and encryption operations on a high-layer data packet through the PDCP layer, adding a PDCP header to obtain a PDCP PDU, performing treatment on the PDCP PDU through the RLC layer, and adding an RLC header to the treated PDCP PDU.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The step of organizing, by the transmitting end, the data in accordance with the determined protocol layer structure includes: performing, by the transmitting end, treatment on a high-layer data packet through the RLC layer in accordance with a data volume capable of being supported by a transmission resource, adding an RLC header to obtain an RLC PDU, performing treatment on the RLC PDU through the MAC layer, and adding an MAC header to the treated RLC PDU.

In a possible embodiment of the present disclosure, the step of determining, by the transmitting end, the protocol layer function to be used for the uplink/downlink data transmission in accordance with the configuration at the network side includes: determining, by the transmitting end, the protocol layer function to be used for the uplink/downlink data transmission in accordance with the configuration at the network side as at least one of the followings: a data packet concatenating function, a header compression function, a header encryption function and a multiplexing function. The step of transmitting, by the transmitting end, the data in accordance with the determined protocol layer function includes: organizing, by the transmitting end, the data in accordance with the determined protocol layer function, and transmitting the organized data.

In a possible embodiment of the present disclosure, the step of transmitting, by the transmitting end, the data in accordance with the determined protocol layer function includes: in the case that the protocol layer function to be used for the uplink/downlink data transmission includes the data packet concatenating function, performing, by the transmitting end, a concatenating operation on high-layer data packets, and organizing the concatenated high-layer data packets into a specific protocol layer and adding a specific protocol layer packet header; or in the case that the protocol layer function to be used for the uplink/downlink data transmission includes the header compression function, the encryption function and the data packet concatenating function, performing, by the transmitting end, encryption and header compression on high-layer data packets, performing a concatenating operation on the resultant high-layer data packets, organizing the concatenated high-layer data packets into a specific protocol layer and adding a specific protocol layer packet header; or in the case that the protocol layer function to be used for the uplink/downlink data transmission includes the data packet concatenating function and the bearer multiplexing function, performing, by the transmitting end, concatenating and bearer multiplexing operations on the high-layer data packets, performing a concatenating operation on the resultant high-layer data packets, organizing the concatenated high-layer data packets into a specific protocol layer and adding a specific protocol layer packet header. The specific protocol layer is a protocol layer capable of supporting the data packet concatenating function, and the specific protocol layer packet header includes a domain for indicating information about a parameter of the high-layer data packet.

Figure 14:
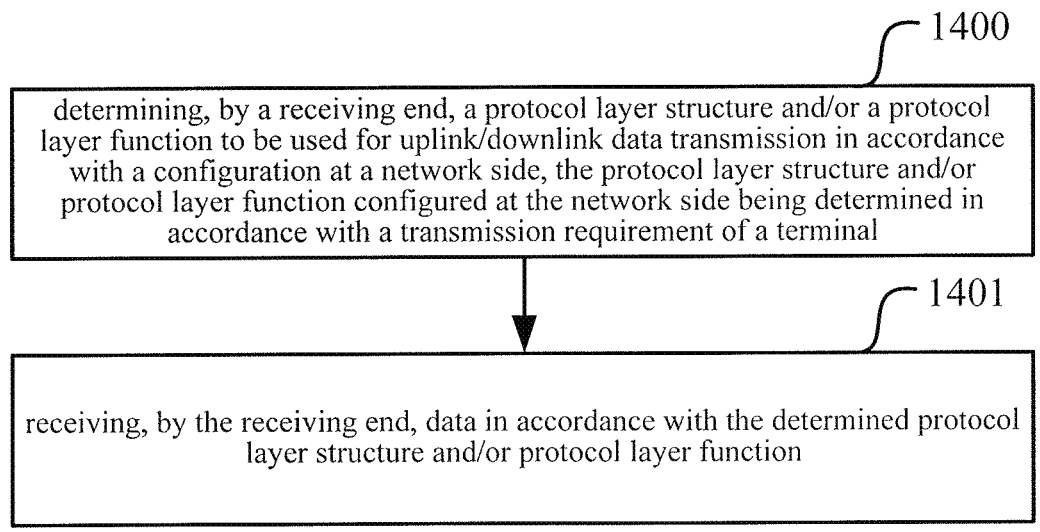
FIG. 14 is a flow chart of another method for data transmission according to at least one embodiment of the present disclosure.

As shown in FIG. 14, the present disclosure provides in some embodiments a method for data transmission, including: Step 1400 of determining, by a receiving end, a protocol layer structure and/or a protocol layer function to be used for uplink/downlink data transmission in accordance with a configuration at a network side, the protocol layer structure and/or protocol layer function configured at the network side being determined in accordance with a transmission requirement of a terminal; and Step 1401 of receiving, by the receiving end, data in accordance with the determined protocol layer structure and/or protocol layer function.

In a possible embodiment of the present disclosure, the step of determining, by the receiving end, the protocol layer structure to be used for the uplink/downlink data transmission in accordance with the configuration at the network side includes: determining, by the receiving end, the protocol layer structure to be used for the uplink/downlink data transmission in accordance with the configuration at the network side as at least one of the followings protocol layers: a PDCP layer, an RLC layer and an MAC layer, and the step of receiving, by the receiving end, the data in accordance with the determined protocol layer structure includes: organizing, by the receiving end, the data in accordance with the determined protocol layer structure, and performing restoration on the received data.

In a possible embodiment of the present disclosure, in the case that the MAC layer is used for the uplink/downlink data transmission, the transmission requirement of the terminal includes at least one of the followings: no header compression or air-interface encryption/decryption is required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the receiving end, the data in accordance with the determined protocol layer structure and performing restoration on the received data includes: restoring, by the receiving end, a high-layer data packet through the MAC layer in accordance with an MAC header indicator in the received data.

In a possible embodiment of the present disclosure, in the case that the PDCP layer and the MAC layer are used for the uplink/downlink data transmission, the transmission requirement of the terminal includes at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously. The step of organizing, by the receiving end, the data in accordance with the determined protocol layer structure and performing restoration on the received data includes: restoring, by the receiving end, a PDCP PDU through the MAC layer in accordance with an MAC header indicator in the received data, removing a PDCP header from the PDCP PDU through the PDCP layer, performing decryption and header decompression, and restoring the high-layer data packet.

In a possible embodiment of the present disclosure, in the case that the PDCP layer and the RLC layer are used for the uplink/downlink data transmission, the transmission requirement of the terminal includes at least one of the followings: header compression and air-interface encryption/decryption are required; and the terminal receives merely data from one bearer during each transmission. The step of organizing, by the receiving end, the data in accordance with the determined protocol layer structure and performing restoration on the received data includes: restoring, by the receiving end, a PDCP PDU through the RLC layer in accordance with an RLC header indicator in the received data, removing a PDCP header from the PDCP PDU through the PDCP layer, performing decryption and header decompression, and restoring the high-layer data packet.

In a possible embodiment of the present disclosure, in the case that the RLC layer and the MAC layer are used for the uplink/downlink data transmission, the transmission requirement of the terminal includes at least one of the followings: no header compression or air-interface encryption/decryption is required; and the terminal receives data from a plurality of bearers simultaneously. The step of organizing, by the receiving end, the data in accordance with the determined protocol layer structure and performing restoration on the received data includes: restoring, by the receiving end, an RLC PDU through the MAC layer in accordance with an MAC header indicator in the received data, removing an RLC header from the RLC PDU through the RLC layer, and restoring the high-layer data packet from concatenated data segments in accordance with an RLC header indicator.

In a possible embodiment of the present disclosure, the step of determining, by the receiving end, the protocol layer function to be used for the uplink/downlink data transmission in accordance with the configuration at the network side includes: determining, by the receiving end, the protocol layer function to be used for the uplink/downlink data transmission in accordance with the configuration at the network side as at least one of the followings: a data packet concatenating function, a header compression function, a header encryption function and a multiplexing function. The step of receiving, by the receiving end, the data in accordance with the determined protocol layer function includes: organizing, by the receiving end, the data in accordance with the determined protocol layer function and performing restoration on the received data.

In a possible embodiment of the present disclosure, the step of organizing, by the receiving end, the data in accordance with the determined protocol layer function and performing restoration on the received data includes: in the case that the protocol layer function to be used for the uplink/downlink data transmission includes the data packet concatenating function, restoring, by the receiving end, high-layer data packets in accordance with a specific protocol layer packet header indicator in the received data; or in the case that the protocol layer function to be used for the uplink/downlink data transmission includes the header compression function, the encryption function and the data packet concatenating function, restoring, by the receiving end, the data on which encryption and header compression operations have been performed in accordance with a specific protocol layer packet header indicator in the received data, performing decryption and header decompression operations on the data, and restoring the high-layer data packets; or in the case that the protocol layer function to be used for the uplink/downlink data transmission includes the data packet concatenating function and the bearer multiplexing function, restoring, by the receiving end, the high-layer data packets in accordance with a specific protocol layer packet header indicator in the received data. The specific protocol layer is a protocol layer capable of supporting the data packet concatenating function, and the specific protocol layer packet header includes a domain for indicating information about a parameter of the high-layer data packet.

According to the embodiments of the present disclosure, the transmitting end and the receiving end may each determine the protocol layer structure and/or protocol layer function to be used for the uplink/downlink data transmission in accordance with the configuration at the network side, and then transmit or receive the data in accordance with the determined protocol layer structure and/or protocol layer function. Because the data is transmitted or received by the transmitting end or the receiving end in accordance with the protocol layer structure and/or protocol layer function, it is able to provide an optimal protocol stack for a specific terminal at a specific scenario and achieve the data transmission in an efficient manner, thereby to achieve a better effect in terms of aspects such as transmission efficiency, time delay, processing complexity, cost overhead and power consumption.

Obviously, a person skilled in the art may make further modifications and improvements without departing from the spirit of the present disclosure, and these modifications and improvements shall also fall within the scope of the present disclosure.

What is claimed is:

1. A method for data transmission, comprising steps of:
   determining, by a transmitting end, a protocol layer structure and/or a protocol layer function to be used for uplink/downlink data transmission in accordance with a configuration at a network side, wherein the protocol layer structure and/or protocol layer function configured at the network side is determined in accordance with a transmission requirement of a terminal; and
   transmitting, by the transmitting end, data in accordance with the determined protocol layer structure and/or protocol layer function,
   wherein the step of determining, by the transmitting end, the protocol layer structure to be used for the uplink/downlink data transmission in accordance with the configuration at the network side comprises:
   determining, by the transmitting end, the protocol layer structure to be used for the uplink/downlink data transmission in accordance with the configuration at the network side as at least one of the followings protocol layers: a Packet Data Convergence Protocol (PDCP) layer, a Radio Link Control (RLC) layer and a Medium Access Control (MAC) layer, and
   the step of transmitting by the transmitting end, the data in accordance with the determined protocol layer structure comprises:
   organizing, by the transmitting end, the data in accordance with the determined protocol layer structure, and transmitting, by the transmitting end, the organized data,
   wherein in the case that the MAC layer is used for the uplink/downlink data transmission, the transmission requirement of the terminal comprises at least one of the followings:
   no header compression or air-interface encryption/decryption is required;
   a size of a data packet to be transmitted is smaller than a predetermined threshold;
   one data packet is transmitted each time with respect to one bearer, and data packet concatenating is not required; and
   the terminal is capable of receiving the data from a plurality of bearers simultaneously; and
   the step of organizing, by the transmitting end, the data in accordance with the determined protocol layer structure comprises:
   adding, by the transmitting end, an MAC header to a high-layer data packet through the MAC layer.

2. The method according to claim 1, wherein in the case that the PDCP layer and the MAC layer are used for the uplink/downlink data transmission,
   the transmission requirement of the terminal comprises at least one of the followings:
   header compression and air-interface encryption/decryption are required;
   a size of a data packet to be transmitted is smaller than a predetermined threshold;
   one data packet is transmitted each time with respect to one bearer, and data packet concatenating is not required; and
   the terminal is capable of receiving the data from a plurality of bearers simultaneously; and
   the step of organizing, by the transmitting end, the data in accordance with the determined protocol layer structure comprises:
   performing, by the transmitting end, header compression and encryption operations on a high-layer data packet through the PDCP layer;
   adding, by the transmitting end, a PDCP header to obtain a PDCP Protocol Data Unit (PDU);
   performing, by the transmitting end, treatment on the PDCP PDU through the MAC layer, and
   adding, by the transmitting end, an MAC header to the treated PDCP PDU.

3. The method according to claim 1, wherein in the case that the PDCP layer and the RLC layer are used for the uplink/downlink data transmission,
   the transmission requirement of the terminal comprises at least one of the followings:
   header compression and air-interface encryption/decryption are required; and
   the terminal receives merely data from one bearer during each transmission; and
   the step of organizing, by the transmitting end, the data in accordance with the determined protocol layer structure comprises:
   performing, by the transmitting end, header compression and encryption operations on a high-layer data packet through the PDCP layer;
   adding, by the transmitting end, a PDCP header to obtain a PDCP PDU;
   performing, by the transmitting end, treatment on the PDCP PDU through the RLC layer, and
   adding, by the transmitting end, an RLC header to the treated PDCP PDU.

4. The method according to claim 1, wherein in the case that the RLC layer and the MAC layer are used for the uplink/downlink data transmission,
   the transmission requirement of the terminal comprises at least one of the followings:
   no header compression or air-interface encryption/decryption is required; and
   the terminal receives data from a plurality of bearers simultaneously, and
   the step of organizing, by the transmitting end, the data in accordance with the determined protocol layer structure comprises:
   performing, by the transmitting end, treatment on a high-layer data packet through the RLC layer in accordance with a data volume capable of being supported by a transmission resource;
   adding, by the transmitting end, an RLC header to obtain an RLC PDU;

performing, by the transmitting end, treatment on the RLC PDU through the MAC layer, and adding, by the transmitting end, an MAC header to the treated RLC PDU.

5. The method according to claim 1, wherein the step of determining, by the transmitting end, the protocol layer function to be used for the uplink/downlink data transmission in accordance with the configuration at the network side comprises:

determining, by the transmitting end, the protocol layer function to be used for the uplink/downlink data transmission in accordance with the configuration at the network side as at least one of the followings: a data packet concatenating function, a header compression function, a header encryption function and a multiplexing function; and the step of transmitting, by the transmitting end, the data in accordance with the determined protocol layer function comprises:

organizing, by the transmitting end, the data in accordance with the determined protocol layer function, and transmitting, by the transmitting end, the organized data.

6. The method according to claim 5, wherein the step of transmitting, by the transmitting end, the data in accordance with the determined protocol layer function comprises:

in the case that the protocol layer function to be used for the uplink/downlink data transmission comprises the data packet concatenating function, performing, by the transmitting end, a concatenating operation on high-layer data packets, organizing, by the transmitting end, the concatenated high-layer data packets into a specific protocol layer, and adding, by the transmitting end, a specific protocol layer packet header; or in the case that the protocol layer function to be used for the uplink/downlink data transmission comprises the header compression function, the encryption function and the data packet concatenating function, performing, by the transmitting end, encryption and header compression on high-layer data packets, performing, by the transmitting end, a concatenating operation on the resultant high-layer data packets, organizing, by the transmitting end, the concatenated high-layer data packets into a specific protocol layer, and adding, by the transmitting end, a specific protocol layer packet header; or in the case that the protocol layer function to be used for the uplink/downlink data transmission comprises the data packet concatenating function and the bearer multiplexing function, performing, by the transmitting end, concatenating and bearer multiplexing operations on the high-layer data packets, performing, by the transmitting end, a concatenating operation on the resultant high-layer data packets, organizing, by the transmitting end, the concatenated high-layer data packets into a specific protocol layer, and adding, by the transmitting end, a specific protocol layer packet header, wherein the specific protocol layer is a protocol layer capable of supporting the data packet concatenating function, and the specific protocol layer packet header comprises a domain for indicating information about a parameter of the high-layer data packet.

7. A method for data transmission, comprising steps of:

determining, by a receiving end, a protocol layer structure and/or a protocol layer function to be used for uplink/downlink data transmission in accordance with a configuration at a network side, wherein the protocol layer structure and/or protocol layer function configured at the network side is determined in accordance with a transmission requirement of a terminal; and receiving, by the receiving end, data in accordance with the determined protocol layer structure and/or protocol layer function, wherein the step of determining, by the receiving end, the protocol layer structure to be used for the uplink/downlink data transmission in accordance with the configuration at the network side comprises:

determining, by the receiving end, the protocol layer structure to be used for the uplink/downlink data transmission in accordance with the configuration at the network side as at least one of the followings protocol layers: a Packet Data Convergence Protocol (PDCP) layer, a Radio Link Control (RLC) layer and a Medium Access Control (MAC) layer; and the step of receiving, by the receiving end, the data in accordance with the determined protocol layer structure comprises:

organizing, by the receiving end, the data in accordance with the determined protocol layer structure, and performing, by the receiving end, restoration on the received data, wherein in the case that the MAC layer is used for the uplink/downlink data transmission, the transmission requirement of the terminal comprises at least one of the followings:

no header compression or air-interface encryption/decryption is required;

a size of a data packet to be transmitted is smaller than a predetermined threshold;

one data packet is transmitted each time with respect to one bearer, and data packet concatenating is not required; and the terminal is capable of receiving the data from a plurality of bearers simultaneously, and the step of organizing, by the receiving end, the data in accordance with the determined protocol layer structure, and performing, by the receiving end, restoration on the received data comprises:

restoring, by the receiving end, a high-layer data packet through the MAC layer in accordance with an MAC header indicator in the received data.

8. The method according to claim 7, wherein in the case that the PDCP layer and the MAC layer are used for the uplink/downlink data transmission, the transmission requirement of the terminal comprises at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously, and the step of organizing, by the receiving end, the data in accordance with the determined protocol layer structure and performing, by the receiving end, restoration on the received data comprises: restoring, by the receiving end, a PDCP Protocol Data Unit (PDU) through the MAC layer in accordance with an MAC header indicator in the received data; removing, by the receiving end, a PDCP header from the PDCP PDU through the PDCP layer; performing, by the receiving end, decryption and header decompression; and restoring, by the receiving end, the high-layer data packet.

9. The method according to claim 7, wherein in the case that the PDCP layer and the RLC layer are used for the uplink/downlink data transmission, the transmission requirement of the terminal comprises at least one of the followings:
header compression and air-interface encryption/decryption are required; and
the terminal receives merely data from one bearer during each transmission, and the step of organizing, by the receiving end, the data in accordance with the determined protocol layer structure, and performing, by the receiving end, restoration on the received data comprises:
restoring, by the receiving end, a PDCP PDU through the RLC layer in accordance with an RLC header indicator in the received data;
removing, by the receiving end, a PDCP header from the PDCP PDU through the PDCP layer;
performing, by the receiving end, decryption and header decompression; and
restoring, by the receiving end, the high-layer data packet.

10. The method according to claim 7, wherein in the case that the RLC layer and the MAC layer are used for the uplink/downlink data transmission,
the transmission requirement of the terminal comprises at least one of the followings:
no header compression or air-interface encryption/decryption is required; and
the terminal receives data from a plurality of bearers simultaneously, and the step of organizing, by the receiving end, the data in accordance with the determined protocol layer structure, and performing, by the receiving end, restoration on the received data comprises:
restoring, by the receiving end, an RLC PDU through the MAC layer in accordance with an MAC header indicator in the received data;
removing, by the receiving end, an RLC header from the RLC PDU through the RLC layer; and
restoring, by the receiving end, the high-layer data packet from concatenated data segments in accordance with an RLC header indicator.

11. The method according to claim 7, wherein
the step of determining, by the receiving end, the protocol layer function to be used for the uplink/downlink data transmission in accordance with the configuration at the network side comprises:
determining, by the receiving end, the protocol layer function to be used for the uplink/downlink data transmission in accordance with the configuration at the network side as at least one of the followings: a data packet concatenating function, a header compression function, a header encryption function and a multiplexing function; and the step of receiving, by the receiving end, the data in accordance with the determined protocol layer function comprises:
organizing, by the receiving end, the data in accordance with the determined protocol layer function; and performing, by the receiving end, restoration on the received data.

12. The method according to claim 11, wherein the step of organizing, by the receiving end, the data in accordance with the determined protocol layer function, and performing, by the receiving end, restoration on the received data comprises:

in the case that the protocol layer function to be used for the uplink/downlink data transmission comprises the data packet concatenating function, restoring, by the receiving end, high-layer data packets in accordance with a specific protocol layer packet header indicator in the received data; or in the case that the protocol layer function to be used for the uplink/downlink data transmission comprises the header compression function, the encryption function and the data packet concatenating function, restoring, by the receiving end, the data on which encryption and header compression operations have been performed in accordance with a specific protocol layer packet header indicator in the received data, performing, by the receiving end, decryption and header decompression operations on the data, and restoring, by the receiving end, the high-layer data packets; or in the case that the protocol layer function to be used for the uplink/downlink data transmission comprises the data packet concatenating function and the bearer multiplexing function, restoring, by the receiving end, the high-layer data packets in accordance with a specific protocol layer packet header indicator in the received data, wherein the specific protocol layer is a protocol layer capable of supporting the data packet concatenating function, and the specific protocol layer packet header comprises a domain for indicating information about a parameter of the high-layer data packet.

13. A transmission device for data transmission, comprising a processor, a memory and a transceiver, wherein
the processor is configured to read a program stored in the memory, to:
determine a protocol layer structure and/or a protocol layer function to be used for uplink/downlink data transmission in accordance with a configuration at a network side, wherein the protocol layer structure and/or protocol layer function configured at the network side is determined in accordance with a transmission requirement of a terminal; and
transmit data in accordance with the determined protocol layer structure and/or protocol layer function,
the transceiver is configured to receive and transmit data, and
the processor takes charge of managing bus architecture and general processings, and the memory is configured to store therein data for the operation of the processor,
wherein the processor is further configured to determine the protocol layer structure to be used for the uplink/downlink data transmission in accordance with the configuration at the network side as at least one of the followings protocol layers: a Packet Data Convergence Protocol (PDCP) layer, a Radio Link Control (RLC) layer and a Medium Access Control (MAC) layer; and
organize the data in accordance with the determined protocol layer structure and transmit the organized data,
wherein in the case that the MAC layer is used for the uplink/downlink data transmission,
the transmission requirement of the terminal comprises at least one of the followings:
no header compression or air-interface encryption/decryption is required;
a size of a data packet to be transmitted is smaller than a predetermined threshold;

one data packet is transmitted each time with respect to one bearer, and data packet concatenating is not required; and the terminal is capable of receiving the data from a plurality of bearers simultaneously, and the processor is further configured to add an MAC header to a high-layer data packet through the MAC layer.

14. The transmission device according to claim 13, wherein in the case that the PDCP layer and the MAC layer are used for the uplink/downlink data transmission, the transmission requirement of the terminal comprises at least one of the followings: header compression and air-interface encryption/decryption are required; a size of a data packet to be transmitted is smaller than a predetermined threshold; one data packet is transmitted each time with respect to one bearer, and data packet concatenating is not required; and the terminal is capable of receiving the data from a plurality of bearers simultaneously, and the processor is further configured to perform header compression and encryption operations on a high-layer data packet through the PDCP layer, add a PDCP header to obtain a PDCP Protocol Data Unit (PDU), perform treatment on the PDCP PDU through the MAC layer, and add an MAC header to the treated PDCP PDU; or in the case that the PDCP layer and the RLC layer are used for the uplink/downlink data transmission, the transmission requirement of the terminal comprises at least one of the followings: header compression and air-interface encryption/decryption are required; and the terminal receives merely data from one bearer during each transmission, and the processor is further configured to perform header compression and encryption operations on a high-layer data packet through the PDCP layer, add a PDCP header to obtain a PDCP PDU, perform treatment on the PDCP PDU through the RLC layer, and add an RLC header to the treated PDCP PDU; or in the case that the RLC layer and the MAC layer are used for the uplink/downlink data transmission, the transmission requirement of the terminal comprises at least one of the followings: no header compression or air-interface encryption/decryption is required; and the terminal receives data from a plurality of bearers simultaneously, and the processor is further configured to perform treatment on a high-layer data packet through the RLC layer in accordance with a data volume capable of being supported by a transmission resource, add an RLC header to obtain an RLC PDU, perform treatment on the RLC PDU through the MAC layer, and add an MAC header to the treated RLC PDU.

15. The transmission device according to claim 13, wherein the processor is further configured to determine the protocol layer function to be used for the uplink/downlink data transmission in accordance with the configuration at the network side as at least one of the followings: a data packet concatenating function, a header compression function, a header encryption function and a multiplexing function; and organize the data in accordance with the determined protocol layer function, and transmit the organized data.

16. The transmission device according to claim 15, wherein the processor is further configured to:

in the case that the protocol layer function to be used for the uplink/downlink data transmission comprises the data packet concatenating function, perform a concatenating operation on high-layer data packets, and organize the concatenated high-layer data packets into a specific protocol layer and add a specific protocol layer packet header; or in the case that the protocol layer function to be used for the uplink/downlink data transmission comprises the header compression function, the encryption function and the data packet concatenating function, perform encryption and header compression on high-layer data packets, perform a concatenating operation on the resultant high-layer data packets, organize the concatenated high-layer data packets into a specific protocol layer and add a specific protocol layer packet header; or in the case that the protocol layer function to be used for the uplink/downlink data transmission comprises the data packet concatenating function and the bearer multiplexing function, perform concatenating and multiplexing operations on the high-layer data packets, perform a concatenating operation on the resultant high-layer data packets, organize the concatenated high-layer data packets into a specific protocol layer and add a specific protocol layer packet header, wherein the specific protocol layer is a protocol layer capable of supporting the data packet concatenating function, and the specific protocol layer packet header includes a domain for indicating information about a parameter of the high-layer data packet.

* * * * *